Sept. 17, 1946.    F. R. MAXWELL    2,407,932
ATTACHMENT CHUCK
Filed March 4, 1944    2 Sheets-Sheet 1

INVENTOR.
Frank R. Maxwell
BY
Arthur L. Randall
atty

Sept. 17, 1946.  F. R. MAXWELL  2,407,932
ATTACHMENT CHUCK
Filed March 4, 1944  2 Sheets-Sheet 2
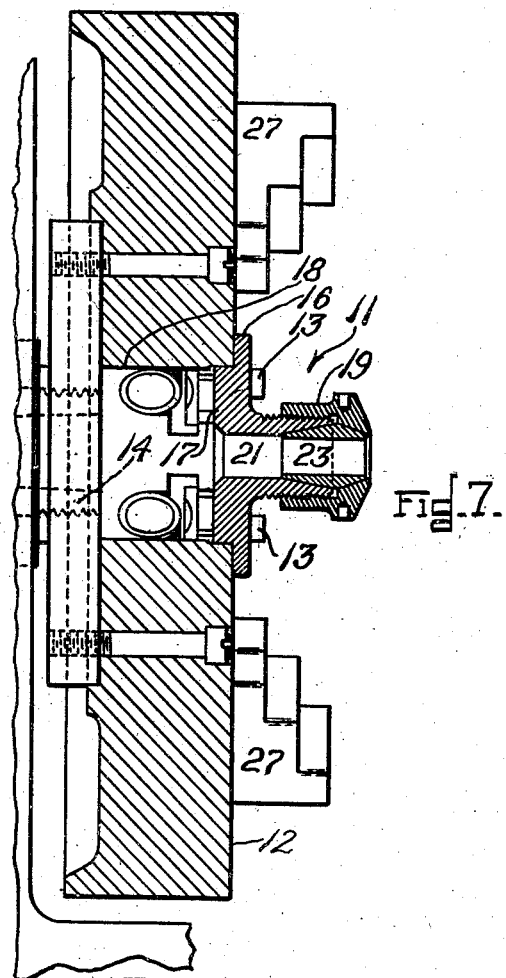
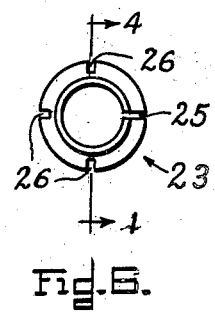
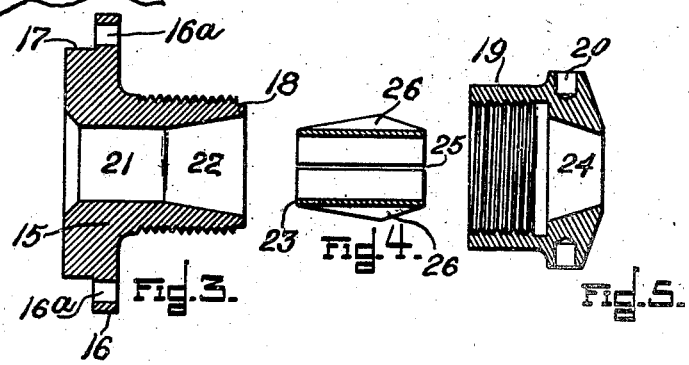
INVENTOR.
Frank R. Maxwell
BY
Arthur F. Randall
Atty.

Patented Sept. 17, 1946

2,407,932

UNITED STATES PATENT OFFICE 2,407,932

ATTACHMENT CHUCK

Frank R. Maxwell, Malden, Mass.

Application March 4, 1944, Serial No. 525,035

1 Claim. (Cl. 279—54)

This invention relates to lathe chucks in general but has particular reference to an adapter attachment for application to an existing standard chuck thereby to render the latter capable of holding smaller work than is possible with the existing chuck as originally constructed.

The invention has for its object to improve the construction of lathe chucks and particularly to provide an attachment chuck of the character indicated which will be of simple, inexpensive and efficient construction.

Heretofore, when a lathe was equipped with a chuck constructed as heretofore, particularly a large chuck, and it was desired to operate upon work smaller than the minimum limit of adjustment of the chuck, it has been necessary to remove the large chuck from the lathe spindle and substitute either a drawing-in collet attachment or a smaller chuck, capable of accommodating the smaller work. In either case, however, it was necessary to first remove the large chuck which, in the case of the larger sizes, was a difficult and often dangerous operation sometimes requiring the services of two or more workmen and overhead block and tackle equipment. The danger accompanying this operation will be obvious when it is borne in mind that some of the larger chucks weigh several hundreds of pounds. Also, when the lathe is installed within a sea-going vessel it is an extremely difficult and dangerous operation to effect such removal and replacement while the vessel is in rough water.

My invention makes it unnecessary to remove the existing standard chuck from the lathe in order to adapt the latter to operate upon work that is smaller than the minimum limit of adjustment of said chuck, and it consists of a supplemental attachment chuck that is removably secured to the outer face or side of the existing chuck in axial alinement with said chuck and the spindle of the lathe.

Figures 1, 2, 8, 9:
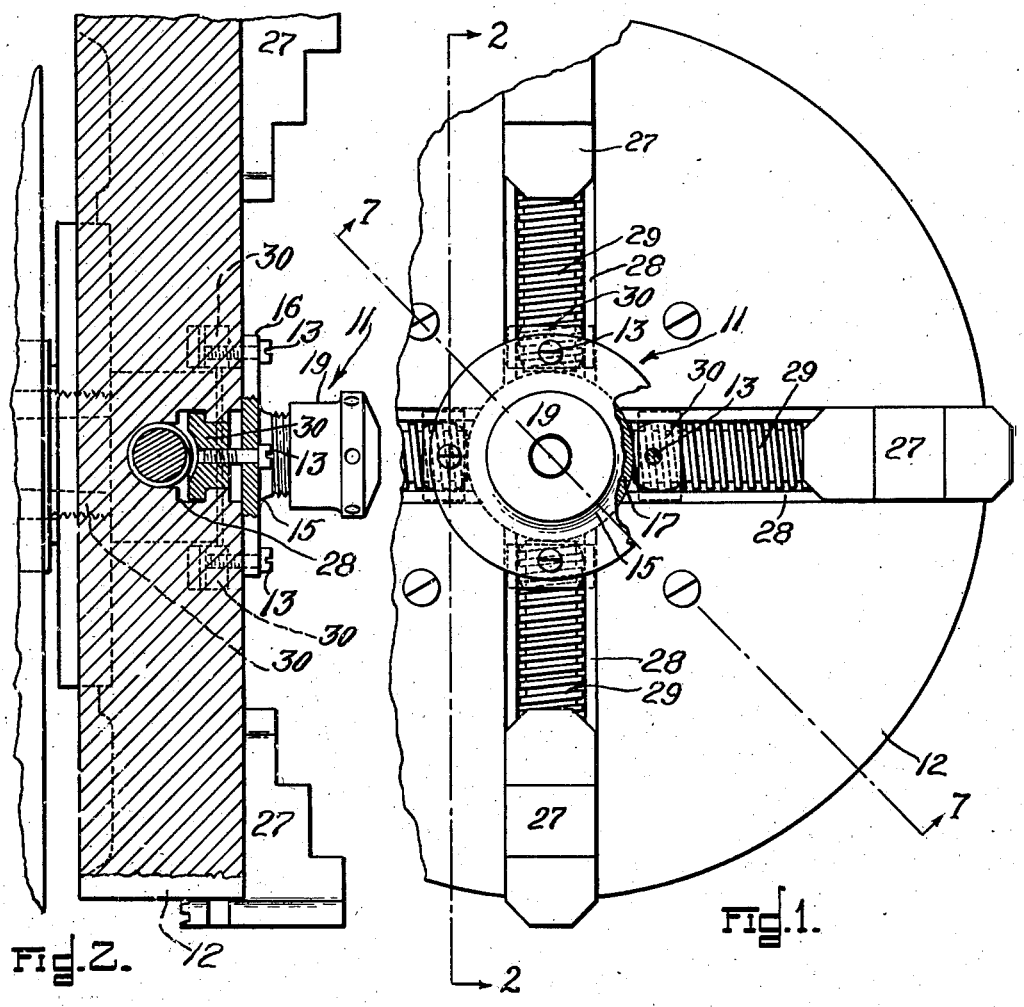
Figure 1 is a front elevation of a chuck showing my new attachment chuck applied thereto, portions of said chuck and of said attachment being shown as broken away.
Figure 2 is a section on line 2—2 of Fig. 1.

Figures 3, 4, 5 and 6 are details of my new attachment chuck, Figure 3 being a longitudinal sectional view of the body member hereinafter referred to; Figure 4 a longitudinal sectional view of the collet, hereinafter referred to, taken on line 4—4 of Figure 6; Figure 5 a longitudinal sectional view of the nut member, hereinafter referred to, and Figure 6 an end elevation of the collet.

Figure 7 is a section on line 7—7 of Fig. 1.

Figures 8 and 9 are details illustrating the construction of the anchor blocks hereinafter referred to.

The illustrated embodiment of my invention comprises a supplemental collet attachment chuck that is indicated generally at 11 in Figs. 1, 2 and 7 and which is fastened in position upon the front face of the usual existing main chuck 12 of the lathe by means of four screws 13, with its axis alined with the axis of said main chuck and the axis of the spindle 14 of the lathe.

As shown particularly in Figs. 3 to 6, inclusive, the attachment chuck 11 comprises a body 15 made with a radial flange 16 formed with apertures 16a to receive the screws 13 which are screwed tightly into threaded holes provided in anchor blocks 30 (Figs. 1, 8 and 9). Upon its inner side the body 15 is made with a circular boss 17 which is snugly, but removably, fitted within the outer end of the bore 18 of the main chuck 12 as shown in Fig. 7, said outer end portion of said bore being first prepared for the reception of said boss 17 by being counterbored as shown to provide a close fit with said boss. This counterboring and the provision of the anchor blocks 30 for screws 13 are the only alterations or additions required to prepare the main chuck for the reception of the attachment chuck.

Upon its outer side the body 15 of the attachment is made with an outstanding nipple 18 which is exteriorly threaded to receive upon it an interiorly threaded nut 19 (Fig. 5). This nut 19 is provided upon its exterior with a plurality of sockets 20 to be engaged by a spanner wrench by means of which the nut is screwed on to and off from the threaded nipple 18 of the body 15. The body 15 is formed with a hole 21 extending therethrough and through nipple 18 and the outer end portion of this hole is made conical as shown at 22, the larger end of said conical portion being outermost and adapted to receive within it one end portion of the collet 23 which is of complementary conical shape. The opposite end portion of collet 23 is of opposed conical shape adapted to fit within a conical socket or aperture 24 provided through the outer end portion of nut 19.

Collet 23 is split longitudinally as at 25 from end to end and also formed upon its exterior with longitudinal grooves or channels 26. In this way it is made contractible so that by forcing the nut 19 against the outer end of the collet the two conical sockets 22 and 24 contract said collet on to the work while the frictional engagement between the collet and nipple 18 ensures rotation of the work with attachment 11 and chuck 12.

In practice I provide for each attachment 11 a set of biconical collets 23, having bores of different diameters, the internal diameter of the largest collet of the set being slightly less than the size of the smallest work within the range of adjustment of the jaws 27 of chuck 12.

In standard chucks 12 of the type shown the jaws 27 thereof are slidably mounted within radial slots 28 which are approximately T-shaped, and are adjusted inwardly and outwardly therein by means of manually operated screws 29, the limit of inward movement of the jaws being determined by the abutting engagement of the inner ends of the jaws which occurs at an appreciable distance away from the axis of the chuck. Within the inner end of each slot 28 I provide an anchor block 30 like that illustrated in Figs. 8 and 9 whose opposite sides underlie shoulders provided by said slot. Each of these anchor blocks is made with a threaded hole 31 into which is tightly screwed one of the four screws 13 as shown in Fig. 2 thereby rigidly securing the attachment in position on chuck 12.

By withdrawing the screws 13, removing the chuck 11 and removing blocks 30 the standard chuck is restored to its normal condition.

What I claim is:

An adapter attachment for application to an existing lathe chuck between the jaws thereof thereby to render the existing chuck capable of holding smaller work than is possible with the existing chuck as originally constructed, said adapter attachment comprising a body made with a hole through it, with a radial apertured flange upon its exterior to seat against the front face of the existing chuck, with a circular boss at its inner end to snugly but removably fit within the outer end of the bore of the existing chuck thereby to center the attachment, and having its outer end portion in the form of an exteriorly threaded nipple, the outer end portion of said hole being made conical with the larger end of said conical portion adjacent to the outer end of said nipple; an interiorly threaded nut adjustably mounted on said nipple; a longitudinally split bi-conical collet whereof one end is fitted within the outer conical end portion of said hole and the opposite end is fitted within a conical socket provided within the outer end portion of said nut, the latter serving to clamp the collet on to the work, a plurality of anchor blocks each made with a threaded hole and adapted to be removably confined within a separate one of the radial slots of said existing chuck, and screws occupying the apertures of said radial flange and said threaded holes by which screws the flange is rigidly fixed in position against the outer face of the existing chuck.

FRANK R. MAXWELL.